D. W. BAIRD.

Concealed Jointed Brace for Carriage Tops.

No. 9,645. Reissued April 12, 1881.

Attest.
John C. Curtis
Jacob Spulw

Inventor.
David W. Baird
by R. T. Osgood,
Atty.

N. PETERS, PHOTO-LITHOGRAPHER, WASHINGTON, D. C.

UNITED STATES PATENT OFFICE.

DAVID W. BAIRD, OF GENEVA, NEW YORK.

CONCEALED JOINTED BRACE FOR CARRIAGE-TOPS.

SPECIFICATION forming part of Reissued Letters Patent No. 9,645, dated April 12, 1881.

Original No. 143,316, dated September 30, 1873; Reissue No. 7,859, dated August 28, 1877. Application for reissue filed June 9, 1879.

*To all whom it may concern:*

Be it known that I, DAVID W. BAIRD, of Geneva, in the county of Ontario and State of New York, have invented a certain new and useful Improvement in Concealed Jointed Braces or Stays for Carriage-Tops; and I do hereby declare that the following is a full, clear, and exact description of the construction and operation of the same, reference being had to the accompanying drawings, in which—

Figure 1:
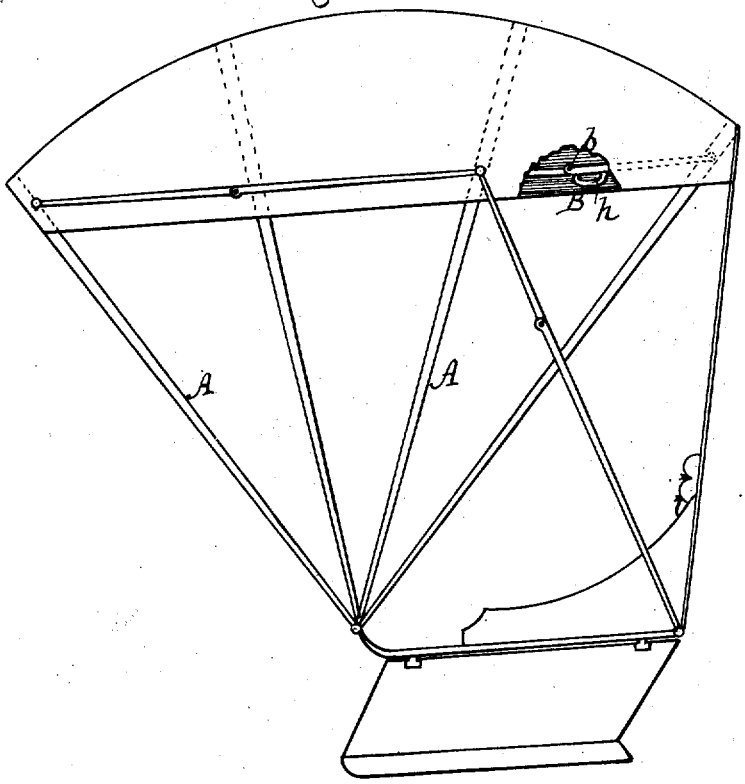
Figure 2:
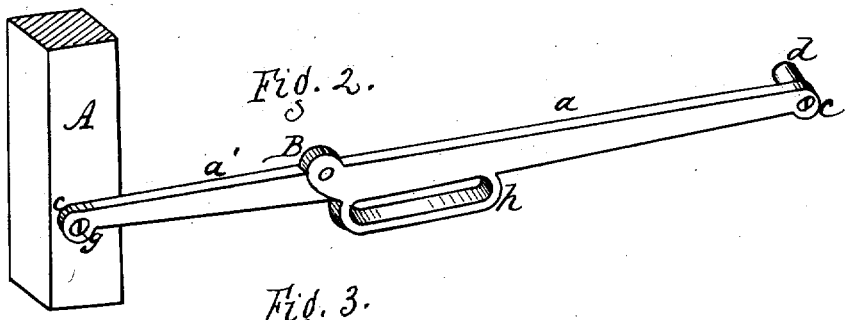
Figure 3:
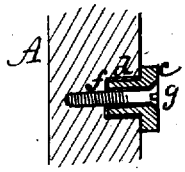

Figure 1 is an elevation of a carriage-top with my improvement applied thereto. Fig. 2 is a perspective view of the concealed brace or stay with joint. Fig. 3 is a section of one end of the device where it is jointed to the bow.

My invention consists of a concealed brace or stay for use between the two rear bows of a carriage-top, constructed and arranged as hereinafter described.

This device is for use between the two rear bows of the carriage-top, to prevent collapse and consequent wrinkling of the leather when the top is turned up or back.

A A represent the bows, and B the concealed brace or stay. This brace or stay is made up of two arms or levers, *a a'*, which are pivoted at *b*, one side of the center, and arranged to "break" or open downward. This pivot is formed solid on one half of the knuckle and passed through the socket of the other and headed down; but, if desired, a separate pivot may be employed passing through both halves of the knuckle. The ends of the arms are made with enlarged heads *c c* and projecting sockets *d d*, which stand inward and rest in holes *f f*, countersunk in the wood of the bows. They are secured in place by ordinary wood-screws, *g g*, which pass through the heads and sockets and strike deep into the wood.

On the under side of the long lever *a* of the brace or stay is formed a handle, *h*, standing downward in the plane of the lever itself, and in a convenient position to be reached and operated by hand. The brace or stay is located between the leather and the lining of the top just far enough in to be covered from sight, but yet lies in a horizontal position, or parallel with the edge of the top-leather, so as to be easily reached and bent downward by a person on the seat. It breaks or collapses downward, and is entirely distinct from the main props and lever-work which raise and lower the carriage-top, its object being simply to keep the top between the two rear bows extended and straight.

I am aware that braces or stays between the two rear bows have before been employed.

The novel features of my invention consist in the breaking or opening of the stay downward and the use of the handle *h* and the enlarged heads *c* and sockets *d*. The handle is of such form that it lies concealed, as well as the levers, and it stands in the same plane with the levers, and does not project through to the inside of the top, and it furnishes a broad and convenient hold for the hand in operating it.

The sockets *d d* form stronger joints or bearings in the wood than screws alone, which have heretofore been used. Screws, by reason of their small size and insecure hold, soon break and tear out; but the sockets *d*, resting in the wood, constitute enlarged bearings, which form the joints, and receive the strain independent of the screws. The screws inserted through the sockets only serve to attach them, but receive little, if any, of the strain that comes upon the joint in opening and closing the levers. There is not only less strain and less liability to tear out by the use of this device, but a larger and much firmer joint is made, and the action is therefore much more uniform and even. The importance of this feature will be perceived when it is considered that the ordinary projecting props cannot be used between the cover and lining for want of space; but the attachment must be made to the wood direct, so as to produce but little projection therefrom. Simple wood-screws have been the best fastenings heretofore known.

In this brace or stay the arm *a* is made considerably longer than the arm *a'*, which brings the pivot *b* on one side of the center, as before described. This is to compensate for the greater length of the rear bow of the carriage-top, and to enable the two rear bows, when turned back, to lie close together or in contact with each other, and to enable the two arms *a a'* of the stay to also fold close together and approximate in position, or lie in line with the bows, thereby preventing angular or inconvenient projection of the brace. To accommodate ordinary carriage-tops the short arm $a'$ is usually made about one-half (more or less) of the arm $a$.

This attachment may be made in the form of a separate and distinct article of manufacture and furnished to the trade for sale to carriage-makers.

Having thus described my invention, I do not claim, broadly, a brace or stay between the two rear bows of a carriage-top; but

I claim—

1. A jointed brace or stay composed of two levers pivoted together so as to break or open downward, one of the levers being provided with a handle for operating the levers, substantially as described.

2. The levers $a$ $a'$, having the enlarged heads $c$, with lateral sockets $d$, for the purpose specified, the stay $a$ being formed with the depending handle $h$, all constructed and arranged as and for the purpose specified.

In witness whereof I have hereunto set my hand.

DAVID W. BAIRD.

Witnesses:

FRED. W. PRINCE,

CHAS. S. BURRALL.